Jan. 22, 1929.    D. W. SMITH    1,699,815
DOUGH ROLLING MACHINE
Filed Dec. 7, 1925    2 Sheets-Sheet 2
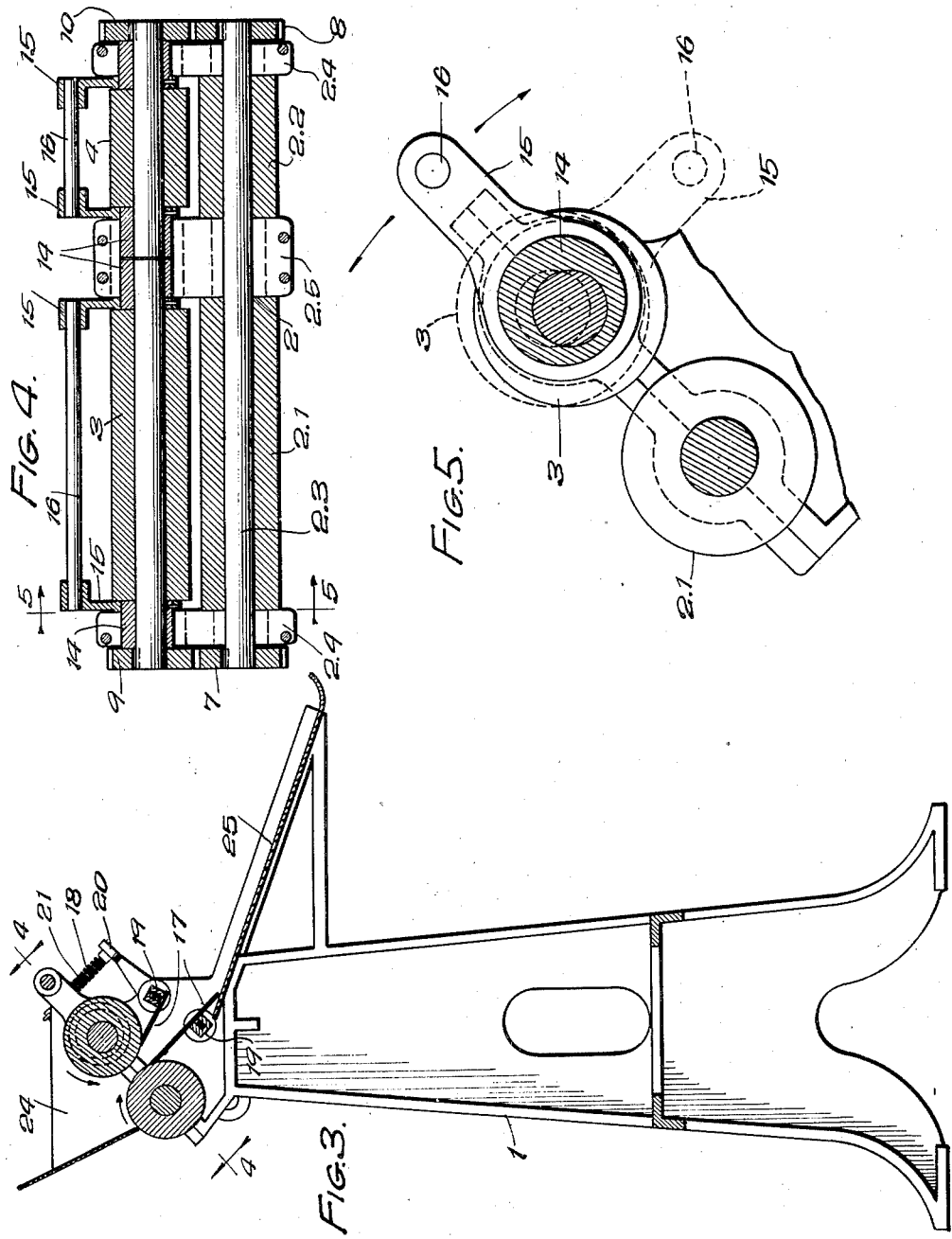
Inventor:
Dennis W. Smith.
Witnesses
Wayne Hudson
Wm E Anderson
By Rummler & Rummler,
Attys.

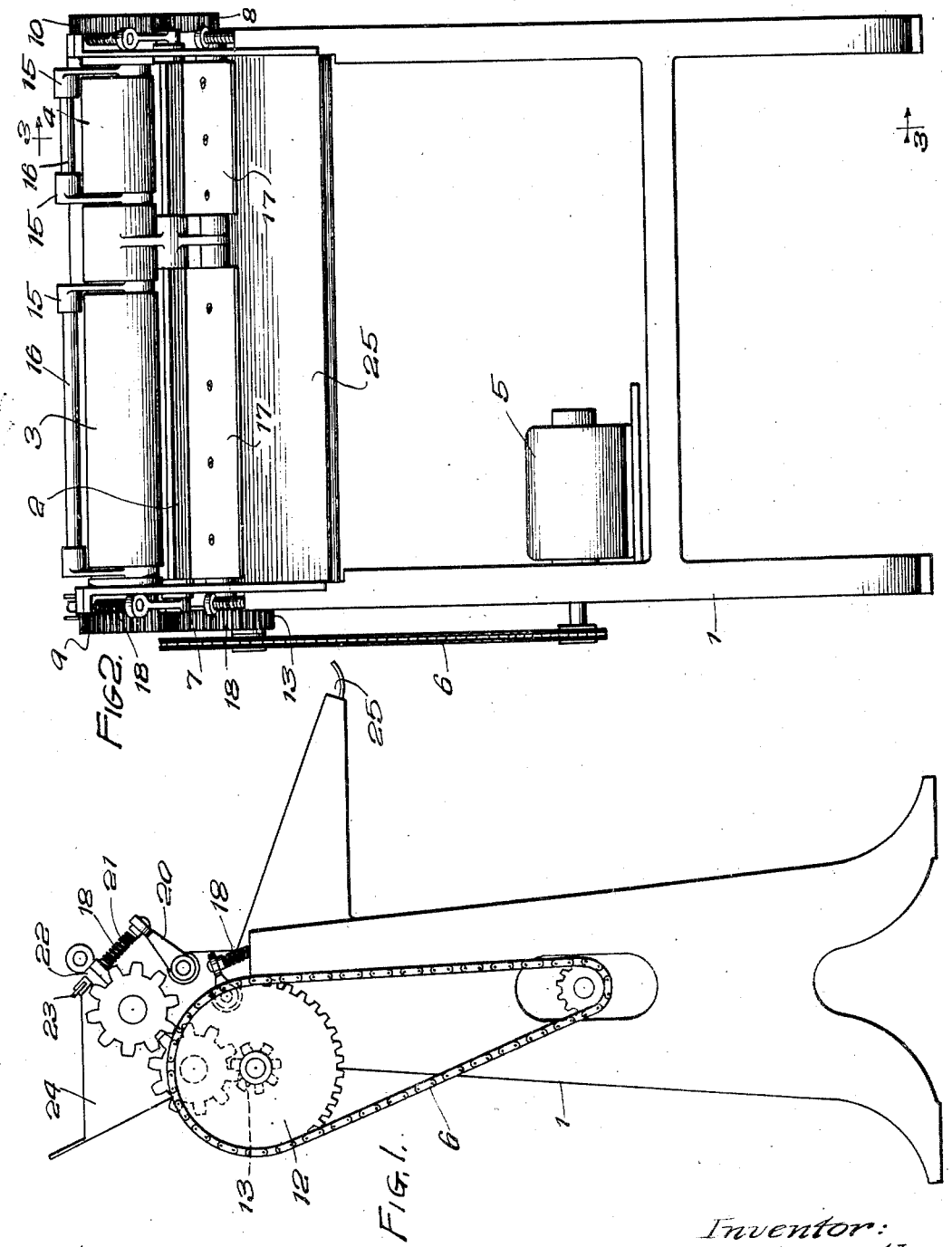

Patented Jan. 22, 1929.

1,699,815

UNITED STATES PATENT OFFICE.

DENNIS W. SMITH, OF CHICAGO, ILLINOIS, ASSIGNOR TO COLBORNE MANUFACTURING COMPANY, OF CHICAGO, ILLINOIS, A CORPORATION OF ILLINOIS.

DOUGH-ROLLING MACHINE.

Application filed December 7, 1925. Serial No. 73,724.

This invention relates to dough rolling machines, and more especially to structural features and adjustments thereof providing for improved operation and greater speed.

The main objects of this invention are to provide a machine of this character adapted for power operation and having an improved form of manual control; to provide a dough rolling machine adapted to roll the dough into a flat thin form of substantially round shape, as distinct from oblong shapes; to provide improved and dependable means for keeping the rolls clean and free from adhesions of dough; to provide improved and readily operable manual means for varying the adjustment of the roll spacings in accordance with the thickness desired for the product; and to provide power transmission means and gearing adapted to accommodate various roll adjustments.

An illustrative embodiment of this invention is shown by the accompanying drawings, wherein:

Fig. 1 is an end elevation of a machine to which this invention is applied.

Fig. 2 is a front elevation of the same.

Fig. 3 is a vertical section taken on the line 3—3 of Fig. 2.

Fig. 4 is a section on the inclined plane occupied by the roll axes indicated by the line 4—4 of Fig. 3.

Fig. 5 is a greatly enlarged vertical section through the top part of the machine on the line 5—5 of Fig. 4.

In the construction shown in the drawings, the machine as a whole comprises mainly a frame 1, a full length roll 2, a medium length roll 3 arranged to coact with one end of the roll 2, and a short roll 4 arranged to coact with the other end of the roll 2. The rolls 3 and 4 are each independently adjustable relative to the roll 2. A source of power, here represented by an electric motor 5, is mounted on the frame 1 and connected by means of a sprocket chain 6 to the roll mechanism above mentioned. The main roll 2 comprises two sections 2.1 and 2.2 which are fixed on a shaft 2.3 journaled in the stationary bearings 2.4 and 2.5.

The several rolls are cooperatively geared together For this purpose, the roll 2 is provided with spur gears 7 and 8 at its driven and driving ends respectively, and the short rolls are provided with gears 9 and 10 respectively at their outer ends to coact with the corresponding gears 7 and 8. The roll gear 7 at the left or driven end coacts with speed reducing means, including a large diameter sprocket wheel 12, to which the said chain 6 is connected, and a small gear wheel 13 coaxial and coturnable with the wheel 12, which gear wheel 13 coacts with the roll gear 7 to drive the roll 2.

The adjustment of rolls 3 and 4 relative to the roll 2 is accommodated by means of a pair of eccentric bearings 14 for each of the short rolls. The pairs of bearings 14 are each provided with lever arms 15 extending forwardly to support handles 16, whereby the eccentric bearings 14 may be partially rotated to shift the rolls 3 and 4 toward and away from the roll sections 2.1 and 2.2 respectively.

Referring to Fig. 5, it will be apparent that rocking the handles 16 upwardly serves to lower the short rolls, whereby the coacting rolls are converged and a thinner product is produced. Opposite movement of either handle 16 tends to raise the corresponding roll for producing a thicker product. Referring to Fig. 2, the corresponding movements are backward and forward to thin and thicken the product.

In order to keep the rolls free from adhesions of dough, scrapers 17 are provided for the several rolls. These scrapers are held in tension with their active edges inclined against the oncoming surfaces of the rolls, being held resiliently in this position by adjustable springs 18, as shown in Figs. 1 and 2. The scrapers 17 are fixed on rocker shafts 19, journaled in the frame 1, and having lever arms 20 provided with adjusting rods 21 extending through bearings 22. The springs 18 embrace the rods 21 and bear between the bearings 22 and arms 20 so as to normally urge the scrapers into firm contact with the rolls. Mounted on the ends of the rods 21, are thumb screws 23 whereby the tension of the springs 18 may be varied.

In order to facilitate operation, the upper and lower rolls are arranged in an inclined plane, as shown in Figs. 3 and 5, at an angle of about forty-five degrees to the horizontal, and a hopper 24 is provided on the upper back side of the machine, whereby the dough may be fed downwardly and forwardly between the rolls for each end respectively. In order to facilitate the removal of the rolled product, an apron or inclined table part 25 is provided in front and below the discharge side of the rolls, where the dough emerges between the scrapers and slides down ready for taking up and removal by the operator, either for successive passing through the machine or for other disposition.

The use of the machine may be illustrated by describing the process of rolling pie crusts which are circular and flat. It is preferable to roll the dough across one way and then run the roller across the other way to work the dough out round and even in thickness. In the present machine, the original ball of dough is fed through under the short roller 4 adjusted for the proper thickness. The dough when passed through the short roller is roughly elliptical in form. Then the piece of dough is turned ninety degrees and fed under the longer roller 3 which is independently adjusted to a narrower thickness. The dough leaves the second roller in circular form of even thickness and has been rolled in both directions as desired; and the operations may be performed very rapidly.

Although but one specific embodiment of this invention has been herein shown and described, it will be understood that numerous details of the construction shown may be altered or omitted without departing from the spirit of this invention.

I claim:

1. A dough rolling machine including a cylindrical rolling means in combination with a plurality of short rolls adapted and arranged to coact independently with different parts of said means to act on a batch of dough successively, said short rolls being of different lengths whereby they are adapted to accommodate the dough as it increases in area by successive rollings.

2. A dough rolling machine including a long roll having two effective surfaces of different lengths arranged in coaxial alinement, in combination with a pair of rolls corresponding substantially in length with the lengths of said long roll surfaces and arranged to coact therewith respectively for rolling the dough whereby a batch of dough may be rolled first into an oblong sheet between the first mentioned roll and the shortest of said other rolls, and then into a substantially round relatively thin sheet between the first mentioned roll and the longer of said other rolls.

3. In a dough rolling machine, a cylindrical rolling means in combination with two relatively short rolls arranged to coact with different parts of said means, and gearing means whereby the outer ends of the short rolls are operatively connected to the ends of said means.

4. A device of the class described comprising a frame, a cylindrical rolling means journaled in said frame on a fixed axis, rolls of different lengths arranged substantially parallel to said means and adapted to coact with different parts thereof, eccentric bearings supporting said rolls, and means for partially rotating said eccentric bearings to adjust the positions of said rolls relative to said means.

5. A device of the class described comprising a frame, a cylindrical rolling means journaled in said frame on a fixed axis, two rolls of different lengths arranged substantially parallel to said means and adapted to coact with different parts thereof, eccentric bearings supporting said two rolls, and handles mounted on said eccentric bearings whereby said bearings may be partially rotated for moving said two rolls toward and away from said means.

6. In a dough rolling machine, rolling means, having a plurality of effective surfaces arranged in coaxial alinement and a plurality of short rolls placed end to end and in parallel arrangement with respect to said rolling means, each roll being independently adjustable with respect to the corresponding surface of said rolling means.

7. In a dough rolling machine, a cylindrical rolling means and a plurality of rolls variably spaced from and coacting with said means and in substantially the same plane.

8. In combination in a dough rolling machine, a plurality of pairs of coacting rollers having the first members of each pair of rolls mounted end to end on the same shaft and the second members being variably spaced from the corresponding first members.

9. In combination, in a dough rolling machine, a plurality of coaxially mounted rolls, and independently adjustable mating rolls for said rolls.

10. In combination in a dough rolling machine, a driven cylindrical rolling means, and two rolls placed end to end coacting with said means, said two rolls being independently driven from the driven means and independently adjustably spaced therefrom.

Signed at Chicago this 4th day of December 1925.

DENNIS W. SMITH.